United States Patent
Zhou

(10) Patent No.: US 11,487,388 B2
(45) Date of Patent: Nov. 1, 2022

(54) ANTI-ACCIDENTAL TOUCH DETECTION METHOD AND APPARATUS, AND TERMINAL

(71) Applicant: HUAWEI TECHNOLOGIES CO., LTD., Guangdong (CN)

(72) Inventor: Xuan Zhou, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 18 days.

(21) Appl. No.: 16/754,596

(22) PCT Filed: Oct. 9, 2018

(86) PCT No.: PCT/CN2018/109485
§ 371 (c)(1),
(2) Date: Apr. 8, 2020

(87) PCT Pub. No.: WO2019/072169
PCT Pub. Date: Apr. 18, 2019

(65) Prior Publication Data
US 2020/0285369 A1   Sep. 10, 2020

(30) Foreign Application Priority Data

Oct. 9, 2017 (CN) .......................... 201710931813.6
Oct. 13, 2017 (CN) .......................... 201710952059.4

(51) Int. Cl.
*G06F 3/041* (2006.01)
*G06F 3/044* (2006.01)
*G06F 3/0488* (2022.01)

(52) U.S. Cl.
CPC .......... *G06F 3/04186* (2019.05); *G06F 3/044* (2013.01); *G06F 3/0412* (2013.01); *G06F 3/0488* (2013.01)

(58) Field of Classification Search
CPC .... G06F 3/04186; G06F 3/0412; G06F 3/044; G06F 3/0488; G06F 3/0418; G06F 3/041; G06F 3/0416; G06F 3/04847
See application file for complete search history.

(56) References Cited

U.S. PATENT DOCUMENTS 5,017,030 A * 5/1991 Crews ................. H01H 13/807
                                                400/489
5,835,079 A * 11/1998 Shieh .................... G06F 3/0488
                                                345/157

(Continued)

FOREIGN PATENT DOCUMENTS

CN    101794197 A    8/2010
CN    105739868 A    7/2016

(Continued)

*Primary Examiner* — Benyam Ketema
(74) *Attorney, Agent, or Firm* — Womble Bond Dickinson (US) LLP

(57) ABSTRACT

An anti-accidental touch detection method is provided, comprising: when a terminal is in a first interface scenario, in response to detecting that a screen is touched, the terminal determines to perform anti-accidental touch detection by using a first anti-accidental touch detection parameter. When the terminal is in a second interface scenario, in response to detecting that the screen is touched, the terminal determines to perform anti-accidental touch detection by using a second anti-accidental touch detection parameter. The first interface scenario is different from the second interface scenario. The first anti-accidental touch detection parameter is different from the second anti-accidental touch detection parameter. The first anti-accidental touch detection parameter and the second anti-accidental touch detection parameter each include at least one of an abnormal-shape touch image attribute and a quantity of frames for detecting an image.

17 Claims, 4 Drawing Sheets

(56) References Cited

U.S. PATENT DOCUMENTS

| | | | | |
|---|---|---|---|---|
| 8,154,529 | B2* | 4/2012 | Sleeman | G06F 3/04166 345/173 |
| 8,294,686 | B2* | 10/2012 | Townsend | G06F 3/04186 340/407.1 |
| 8,543,833 | B2* | 9/2013 | Geiger | G06F 3/04883 713/186 |
| 8,627,237 | B2* | 1/2014 | Chaudhri | G06F 21/36 345/173 |
| 8,797,280 | B2* | 8/2014 | Simmons | G06F 3/04186 345/173 |
| 8,902,174 | B1* | 12/2014 | Peterson | G06F 3/04166 345/173 |
| 8,938,612 | B1* | 1/2015 | Mittal | G06F 3/04883 345/173 |
| 9,158,454 | B2* | 10/2015 | Westerman | G06F 3/041 |
| 9,489,097 | B2* | 11/2016 | Johansson | G06F 3/0446 |
| 9,880,655 | B2* | 1/2018 | O'Connor | G06F 3/04186 |
| 10,108,257 | B2* | 10/2018 | Yanai | G06F 3/0443 |
| 10,168,843 | B2* | 1/2019 | Worfolk | G06F 3/0416 |
| 10,282,024 | B2* | 5/2019 | Harrison | G06F 3/04186 |
| 10,372,260 | B2* | 8/2019 | Huffman | G06F 1/3203 |
| 2005/0063564 | A1* | 3/2005 | Yamamoto | B60R 25/2045 701/1 |
| 2006/0026535 | A1* | 2/2006 | Hotelling | G06F 3/04883 715/863 |
| 2006/0097991 | A1* | 5/2006 | Hotelling | G06F 3/04166 345/173 |
| 2006/0109252 | A1* | 5/2006 | Kolmykov-Zotov | G06F 3/03545 345/173 |
| 2007/0152976 | A1 | 7/2007 | Townsend et al. | |
| 2008/0012838 | A1* | 1/2008 | Rimon | G06F 3/0445 345/173 |
| 2008/0036743 | A1* | 2/2008 | Westerman | G06F 3/038 345/173 |
| 2008/0168403 | A1* | 7/2008 | Westerman | G06F 3/0488 715/863 |
| 2008/0284751 | A1* | 11/2008 | Hsu | G06F 3/04162 345/173 |
| 2008/0309629 | A1* | 12/2008 | Westerman | G06F 3/0488 345/173 |
| 2009/0095540 | A1* | 4/2009 | Zachut | G06K 9/00 178/18.03 |
| 2009/0174679 | A1* | 7/2009 | Westerman | G06F 3/04186 345/173 |
| 2010/0134424 | A1* | 6/2010 | Brisebois | G06F 3/0488 345/173 |
| 2010/0220066 | A1* | 9/2010 | Murphy | G06F 1/1641 345/173 |
| 2010/0289754 | A1* | 11/2010 | Sleeman | G06F 3/04166 345/173 |
| 2011/0074701 | A1* | 3/2011 | Dickinson | G06F 3/041 345/173 |
| 2011/0291944 | A1* | 12/2011 | Simmons | G06F 3/04186 345/173 |
| 2012/0299860 | A1* | 11/2012 | Wang | G06F 3/04883 345/173 |
| 2013/0207913 | A1* | 8/2013 | Takashima | G06F 3/0488 345/173 |
| 2013/0222332 | A1* | 8/2013 | Kyrynyuk | G06F 3/041661 345/174 |
| 2013/0300696 | A1* | 11/2013 | Haran | G06F 3/0418 345/173 |
| 2013/0328828 | A1* | 12/2013 | Tate | G06F 3/041662 345/174 |
| 2014/0125620 | A1* | 5/2014 | Panther | G16H 40/63 345/173 |
| 2014/0300559 | A1* | 10/2014 | Tanimoto | G06F 3/0484 345/173 |
| 2014/0340321 | A1* | 11/2014 | Chang | G06F 3/0418 345/173 |
| 2015/0040243 | A1 | 2/2015 | Mittal | |
| 2015/0177870 | A1* | 6/2015 | Nicholson | G06F 3/041 345/174 |
| 2015/0338991 | A1* | 11/2015 | Westerman | G06F 3/04186 345/178 |
| 2016/0004380 | A1* | 1/2016 | Kim | G06V 40/20 345/174 |
| 2016/0034113 | A1* | 2/2016 | Kimura | G06F 9/451 715/790 |
| 2016/0034128 | A1* | 2/2016 | Kimura | G06F 3/0486 715/769 |
| 2016/0188181 | A1 | 6/2016 | Smith | |
| 2016/0291764 | A1* | 10/2016 | Herring | G06F 3/0488 |
| 2018/0059866 | A1* | 3/2018 | Drake | G06F 3/0488 |
| 2018/0101263 | A1* | 4/2018 | Takashima | G06F 3/04186 |
| 2018/0129347 | A1* | 5/2018 | Files | G06F 3/04162 |
| 2018/0157371 | A1* | 6/2018 | Harrison | G06F 3/04186 |
| 2018/0329580 | A1* | 11/2018 | Aurongzeb | G09G 3/035 |
| 2018/0335889 | A1* | 11/2018 | Tucker | G06F 3/04186 |
| 2019/0079613 | A1* | 3/2019 | Zhang | H04M 1/0266 |
| 2021/0096725 | A1* | 4/2021 | Garg | G06F 3/0412 |

FOREIGN PATENT DOCUMENTS

| | | |
|---|---|---|
| CN | 106406733 A | 2/2017 |
| CN | 106446786 A | 2/2017 |
| CN | 106527818 A | 3/2017 |
| CN | 107122083 A | 9/2017 |
| EP | 2626778 A2 | 8/2013 |
| KR | 20120050356 A | 5/2012 |

* cited by examiner

ANTI-ACCIDENTAL TOUCH DETECTION METHOD AND APPARATUS, AND TERMINAL

CROSS-REFERENCE TO RELATED APPLICATIONS

This application is a national stage of International Patent Application No. PCT/CN2018/109485, filed on Oct. 9, 2018, which claims priority to Chinese Patent Application No. 201710952059.4, filed on Oct. 13, 2017 and Chinese Patent Application No. 201710931813.6, filed on Oct. 9, 2017. All of the aforementioned applications are hereby incorporated by reference in their entireties.

TECHNICAL FIELD

This application relates to the field of electronic device technologies, and in particular, to an anti-accidental touch detection method and apparatus, and a terminal.

BACKGROUND

Currently, with development of electronic devices (for example, a mobile terminal such as a mobile phone and a tablet computer), a large screen with a narrow bezel or even without a bezel is favored by a user. Although the large screen with the narrow bezel or without the bezel brings a visual impact to a user, an accidental touch is increasingly becoming a sore point in using an electronic device by the user.

To avoid the accidental touch, the electronic device can determine an accidental touch operation such as non-finger tapping by using an anti-accidental touch detection algorithm, and shield the accidental touch operation. Currently, a relatively common anti-accidental touch detection algorithm is mainly to obtain multi-frame image data from a touchscreen, extract a key interaction characteristic (for example, an image shape and an area) of the obtained multi-frame image data, and determine whether the extracted key interaction characteristic is an abnormal-shape touch image, to determine whether the accidental touch operation is caused by a face, an ear, a thigh, or the like.

However, in various application scenarios in which the user uses the electronic device, the electronic device performs anti-accidental touch detection by using a same anti-accidental touch detection algorithm. Consequently, the anti-accidental touch detection is performed in a single form and has relatively poor flexibility.

SUMMARY

Embodiments of this application provide an anti-accidental touch detection method and apparatus, and a terminal, to determine an abnormal-shape accidental touch operation automatically by using different abnormal-shape anti-accidental touch detection parameters when the terminal is in different interface scenarios, thereby improving flexibility of anti-accidental touch detection.

According to a first aspect, an anti-accidental touch detection method is provided. In this method, when a terminal is in different interface scenarios, in response to a detected touch operation, the terminal determines an abnormal-shape accidental touch operation by using different abnormal-shape anti-accidental touch detection parameters, to meet different anti-accidental touch requirements of a user in different scenarios and different delay tolerances, thereby improving flexibility of anti-accidental touch detection.

The anti-accidental touch detection parameter may be understood as a parameter used to detect an accidental touch operation in an anti-accidental touch detection algorithm, and may include at least one of an abnormal-shape touch image attribute and a quantity of frames for detecting an image.

The abnormal-shape touch image attribute includes at least one of a shape of an abnormal-shape touch image, an area of the abnormal-shape touch image, and long and short axis thresholds of the abnormal-shape touch image.

The quantity of frames for detecting the image may be determined based on a frame reporting rate of a screen and a tolerance time of the user. For example, the quantity of frames for detecting the image may be a ratio of the frame reporting rate of the screen to the tolerance time of the user.

In a possible design, an interface scenario of the terminal includes a first interface scenario and a second interface scenario. When the terminal is in the first interface scenario, in response to detecting that the screen is touched, the terminal determines to perform anti-accidental touch detection by using a first anti-accidental touch detection parameter. When the terminal is in the second interface scenario, in response to detecting that the screen is touched, the terminal determines to perform anti-accidental touch detection by using a second anti-accidental touch detection parameter. The first interface scenario is different from the second interface scenario, and the first anti-accidental touch detection parameter is different from the second anti-accidental touch detection parameter.

In another possible design, the terminal may preset anti-accidental touch detection configuration parameters corresponding to different interface scenarios.

In a possible implementation, the interface scenario is a lock screen interface, and an anti-accidental touch detection parameter corresponding to the lock screen interface include: a shape of an abnormal-shape touch image is a capacitive image shape, an area of the abnormal-shape touch image is greater than a first specified area, and the quantity of frames for detecting the image is single frame detection.

In another possible implementation, the interface scenario is a call interface, and an anti-accidental touch detection parameter corresponding to the call interface includes: a shape of an abnormal-shape touch image is a circle or a long bar shape, long and short axis thresholds of the abnormal-shape touch image are less than specified long and short axis thresholds, and the quantity of frames for detecting the image meets a predetermined range of a frame quantity.

In still another possible implementation, the interface scenario is a password interface, and an anti-accidental touch detection parameter corresponding to the password interface includes: a shape of an abnormal-shape touch image is a capacitive image shape, an area of the abnormal-shape touch image is less than a second specified area, and the quantity of frames for detecting an image is greater than a specified frame quantity.

In still possible implementation, the interface scenario is an input method interface, and an anti-accidental touch detection parameter corresponding to the input method interface includes: an area of an abnormal-shape touch image is less than an area of a finger image, and the quantity of frames for detecting the image is single frame detection.

In still another possible design, after performing anti-accidental touch detection, the terminal generates touch feedback if the terminal determines, based on first N frames of images in the quantity of frames for detecting the image, that a non-accidental touch operation is detected, where N is a positive integer greater than or equal to 1. The terminal recalls generated touch feedback and performs accidental touch feedback if the terminal determines, based on a frame of image other than the first N frames of images in the quantity of frames for detecting the image, that an accidental touch operation is detected.

According to a second aspect, an anti-accidental touch detection apparatus is provided, where the anti-accidental touch detection apparatus has a function of implementing the anti-accidental touch detection method in the first aspect. The function may be implemented by using hardware, or may be implemented by hardware by executing corresponding software. The hardware or software includes one or more modules corresponding to the foregoing function.

In a possible design, the anti-accidental touch detection apparatus includes a display unit, a detection unit, and a processing unit, and functions of the display unit, the detection unit, and the processing unit may be corresponding to the method steps. Details are not described herein again.

According to a third aspect, a terminal is provided, where the terminal includes a processor, a memory, a screen, and an input/output device. The input/output device, the screen, and the memory may be connected to the processor by using a bus. The screen is configured to display an interface; the input/output device is configured to detect a touch operation performed by a user on a screen; the memory is configured to store program code to be executed by the processor; and the processor is configured to: invoke the program code stored in the memory, and perform a function of the anti-accidental touch detection method in the first aspect and any possible design of the first aspect.

According to a fourth aspect, a computer-readable storage medium is provided, and the computer-readable storage medium stores an instruction. When the instruction is run on a computer, the computer is enabled to perform the anti-accidental touch detection method in the first aspect and any possible design of the first aspect.

According to a fifth aspect, a computer program product including an instruction is provided. When the computer program product including the instruction is run on a computer, the computer is enabled to perform the anti-accidental touch detection method in the first aspect and any possible design of the first aspect.

According to the anti-accidental touch detection method and apparatus, and the terminal provided in the embodiments of this application, the anti-accidental touch detection is performed automatically by using different abnormal-shape anti-accidental touch detection algorithms in different interface scenarios, so that different application requirements used by the user can be matched, to implement an application-level configuration of an abnormal-shape anti-accidental touch detection parameter.

DESCRIPTION OF EMBODIMENTS

The following describes the embodiments of this application with reference to the accompanying drawings.

An anti-accidental touch detection method and apparatus, and a terminal provided in the embodiments of this application may be applied to an electronic device, and the electronic device may be a terminal (mobile terminal), a mobile station (MS), a piece of user equipment (UE), or the like. The electronic device may be a device that provides voice and/or data connectivity for a user, a handheld device having a wireless connection function, or another processing device connected to a wireless modem. For example, the electronic device may be a mobile phone (or referred to as a "cellular" phone), or a computer having a mobile terminal, or may be a portable, pocket-sized, handheld, computer built-in, or in-vehicle mobile apparatus. Certainly, the electronic device may alternatively be a wearable device (for example, a smartwatch or a smart band), a tablet computer, a personal computer (PC), a personal digital assistant (PDA), a Point of Sale (POS), or the like. An example in which the electronic device is a terminal is used for description in an embodiment of this application.

Figure 1:
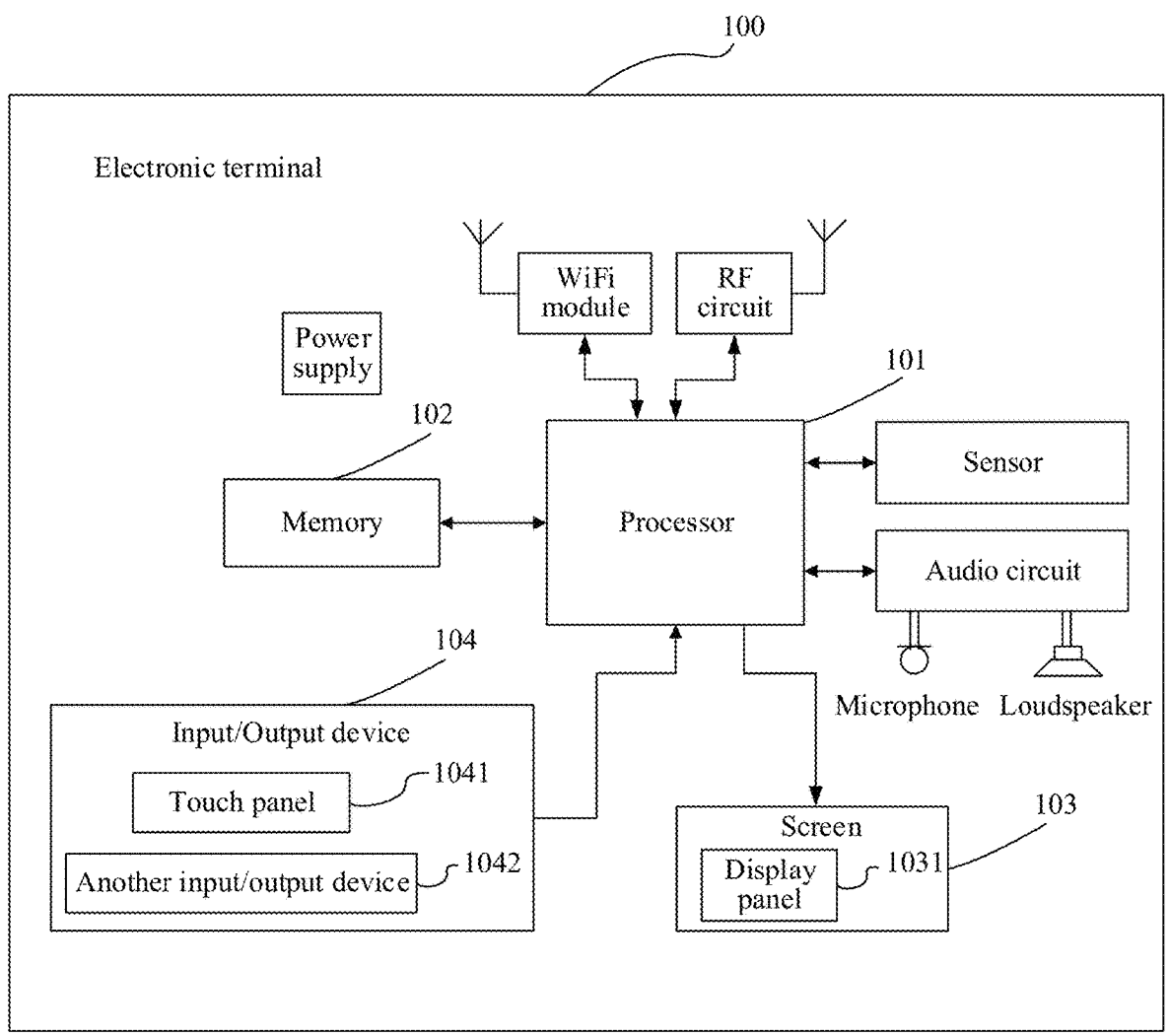
FIG. 1 is a schematic structural diagram of hardware of an electronic device according to an embodiment of this application.

FIG. 1 is an optional schematic structural diagram of hardware of a terminal 100 according to an embodiment of this application.

As shown in FIG. 1, the terminal 100 may include a processor 101, and a memory 102, a screen 103, and an input/output device 104 that are separately connected to the processor 101. The memory 102 may be configured to store a program and data, including a program of an application displayed on the screen 103 in this embodiment of this application. The processor 101 performs various function applications of the terminal 100 and data processing by running the program stored in the memory 102, for example, performs a function of controlling an application installed in the terminal 100 to be displayed on the screen 103.

The following describes each composition part of the terminal 100 in detail with reference to FIG. 1.

The processor 101 is a control center of the terminal 100, and is connected to all parts of the entire terminal by using various interfaces and lines. The processor 101 performs various functions of the terminal 100 and data processing by running or executing the program (or referred to as a "module") stored in the memory 102 and invoking the data stored in the memory 102, to perform overall monitoring on the terminal 100.

Optionally, the processor 101 may include at least one processing unit. Optionally, the processor 101 may integrate an application processor and a modem processor. The application processor mainly processes an operating system, a user interface, an application program, and the like, and the modem processor mainly processes wireless communication. It may be understood that, alternatively, the modem processor may not be integrated into the processor 101.

The memory 102 mainly includes a program storage area and a data storage area. The program storage area may store an operating system (for example, an Android operating system, referred to as an "Android system" for short, an ios operating system, or another operating system, where the operating system may also be referred to as a "system" for short), an application program required by at least one function (for example, a sound play function or an image play function), a program of at least one application in this embodiment of this application, and the like. The data storage area may store data created based on use of the terminal 100, where the data includes related setting information, use status information, or the like of the application displayed on the screen 103 in this embodiment of this application. In addition, the memory 102 may include a high-speed random access memory, and may further include a nonvolatile memory, for example, at least one magnetic disk storage device, a flash device, and another volatile solid-state storage device.

The input/output device 104 may be configured to: receive entered number or character information, and generate an input instruction of key signal input related to user setting and function control of the terminal 100, where the input instruction includes an accidental touch operation of a user on the screen of the terminal in this embodiment of this application. Specifically, the input/output device 104 may include a touch panel 1041 and another input/output device 1042. The touch panel 1041, also referred to as a touchscreen, may collect a touch operation of the user on or near the touch panel 1041 (such as an operation of the user on or near the touch panel 1041 by using any suitable object or accessory such as a finger or a stylus, or an accidental touch operation of non-finger tapping performed by a cheek, an ear, a thigh, and the like of the user), and drive a corresponding connection apparatus based on a preset program. Optionally, the touch panel 1041 may include two parts: a touch detection apparatus and a touch controller. The touch detection apparatus detects a touch location of the user, detects a signal brought by a touch operation, and transmits the signal to the touch controller. The touch controller receives touch information from the touch detection apparatus, converts the touch information into touch point coordinates, and sends the touch point coordinates to the processor 101. In addition, the touch controller can receive and execute a command sent by the processor 101. In addition, the touch panel 1041 may be implemented in a plurality of types, for example, a resistive type, a capacitive type, an infrared type, and a surface acoustic wave type. In addition to the touch panel 1041, the input/output device 104 may further include the another input/output device 1042. Specifically, the other input/output device 1042 may include but is not limited to one or more of a physical keyboard, a function key (such as a volume control key or an on/off key), a trackball, a mouse, a joystick, and the like.

The screen 103 may be configured to display information entered by the user or information provided for the user, and various applications installed in the terminal 100. The screen 103 may include a display panel 1031. Optionally, the display panel 1031 may be configured by using a liquid crystal display (Liquid Crystal Display, LCD), an organic light-emitting diode (organic light-emitting diode, OLED), or the like. Further, the touch panel 1041 may cover the display panel 1031. When detecting the touch operation on or near the touch panel 1041, the touch panel 1041 transmits the touch operation to the processor 101 to determine a type of a touch event, and then the processor 101 provides corresponding visual output on the display panel 1031 based on the type of the touch event. Although the touch panel 1041 and the display panel 1031 in FIG. 1 are used as two independent parts to implement input and output functions of the terminal 100, in some embodiments, the touch panel 1041 and the display panel 1031 may be integrated to implement the input and output functions of the terminal 100.

A person skilled in the art may understand that the internal structure of the terminal 100 shown in FIG. 1 does not constitute a limitation on a specific structure of the terminal, and may include more or fewer parts than those shown in the figure, or may combine some parts, or have different part arrangements. For example, the terminal 100 may further include an audio circuit, a loudspeaker, and a microphone that provide an audio interface between the user and the terminal 100. When communicating with the outside in a wireless manner, the terminal 100 may further include a radio frequency (Radio Frequency, RF) circuit and an antenna connected thereto, a wireless fidelity (wireless fidelity, Wi-Fi) module and an antenna connected thereto, and the like. In addition, the terminal 100 further includes a sensor, a power supply that supplies power to the electronic terminal 100, and the like. Details are not described herein.

It may be learned from the foregoing description that the touch panel 1041 may collect the touch operation of the user on or near the touch panel 1041, and transmit the touch operation of the user on or near the touch panel 1041 to the processor 101 after detecting the touch operation of the user on or near the touch panel 1041. The processor 101 performs feedback processing on the operation based on a type of a touch event. However, when using the terminal, the user may perform an accidental touch operation on the touch panel 1041. For example, when the terminal 100 is in a call interface scenario such as a call or voice play scenario, an accidental touch may be caused when a face and an ear are close to the touch panel 1041. For another example, when the terminal 100 is in an input method interface scenario, an accidental touch may be caused when a palm touches the touch panel 1041. After the user performs an accidental touch operation on the touch panel 1041, the touch panel 1041 collects the accidental touch operation of the user, and transmits the accidental touch operation to the processor 101. If the processor 101 processes the accidental touch operation in a same manner as processing a normal operation, the user may have trouble in using the terminal. Therefore, after receiving an operation transmitted by the touch panel, the processor 101 may determine whether the operation is an accidental touch operation. If the operation is the accidental touch operation, anti-accidental touch feedback (for example, no response to the accidental touch operation, or it may be understood as shielding the accidental touch operation) may be performed. If the operation is a normal operation, normal operation feedback (non-accidental touch operation feedback) may be performed, to avoid, to some extent, unnecessary trouble caused by accidental touch to the user.

In an anti-accidental touch detection method in a current technology (Host processing), the processor 101 obtains, from the touch panel 1041, multi-frame image data of a capacitive image generated by an accidental operation of a user on or near the touch panel 1041, invokes an anti-accidental touch algorithm pre-stored in the memory 102, and determines, based on the obtained multi-frame image data, whether the touch operation is an accidental touch operation. In this method for determining the accidental touch operation, the multi-frame image data needs to be obtained to determine whether the touch operation is an accidental touch operation, to improve accuracy of detecting the accidental touch operation. However, a larger quantity of frames of obtained image data indicates a longer detection time. Therefore, currently, when anti-accidental touch operation is to be determined and anti-accidental touch processing is to be performed, accuracy and a detection time of detecting the accidental touch operation are comprehensively considered, a quantity of image data frames is determined, and the anti-accidental touch processing is to be performed by determining the accidental touch operation by using the determined quantity of image data frames.

However, the user uses the terminal 100 in various scenarios. Different anti-accidental touch requirements and different delay tolerances are required in different scenarios, in other words, different accuracy of detecting an accidental touch operation and different detection duration are required. For example, in a scenario in which the user makes a call by using an earpiece, the user requires relatively high accuracy of detecting an accidental touch operation. However, because few operations are performed on the screen 103, a detection time requirement is not high. In this case, anti-accidental touch processing may be performed by using multi-frame image data. In a scenario in which the terminal 100 is in a lock screen state and the user views a desktop or pulls down a notification bar, the user has a relatively low delay tolerance, and therefore a relatively short detection time is required. In a scenario in which the terminal 100 is in a password input interface and the user enters a password, because the terminal 100 locks up or even resets if a wrong password is entered, relatively high accuracy of detecting an accidental touch operation is required, but a delay tolerance is relatively high. In this case, the anti-accidental touch processing may be performed by using multi-frame image data.

The embodiments of this application provide an anti-accidental touch detection method. An anti-accidental touch detection parameter is set in an anti-accidental touch algorithm used in the method, and different anti-accidental touch detection parameters are used in different interface scenarios. The touch panel 1041 detects that the screen 103 is touched. The processor 101 responds to a touch operation that the screen 103 is touched, and determines a current interface scenario of the terminal 100. Then, the processor 101 invokes an anti-accidental touch detection parameter matching the current interface scenario, and determines, based on the invoked anti-accidental touch detection parameter, whether the current touch operation is an accidental touch operation, to meet different anti-accidental touch requirements and different delay tolerances of the user in different scenarios and improve flexibility of anti-accidental touch detection.

Generally, an accidental touch operation of the user on the terminal 100 is an abnormal tapping operation caused by a face, an ear, a thigh, or the like on the touch panel 1041 or near the touch panel 1041. The abnormal tapping operation may form, on the screen, an abnormal-shape touch image different from a finger image. Therefore, the accidental touch operation in the embodiments of this application may also be referred to as an abnormal-shape accidental touch operation. In the following embodiments, the abnormal-shape accidental touch operation and the accidental touch operation are sometimes used alternately. However, a person skilled in the art may understand a meaning of the abnormal-shape accidental touch operation and the accidental touch operation. When a difference between the abnormal-shape accidental touch operation and the accidental touch operation is not emphasized, meanings expressed by the abnormal-shape accidental touch operation and the accidental touch operation are the same.

Some terms in this application are first described, to help a person skilled in the art have a better understanding.

(1) An abnormal-shape accidental touch operation may be understood as an accidental touch operation performed on the touch panel 1041 due to abnormal tapping.

Figure 2:
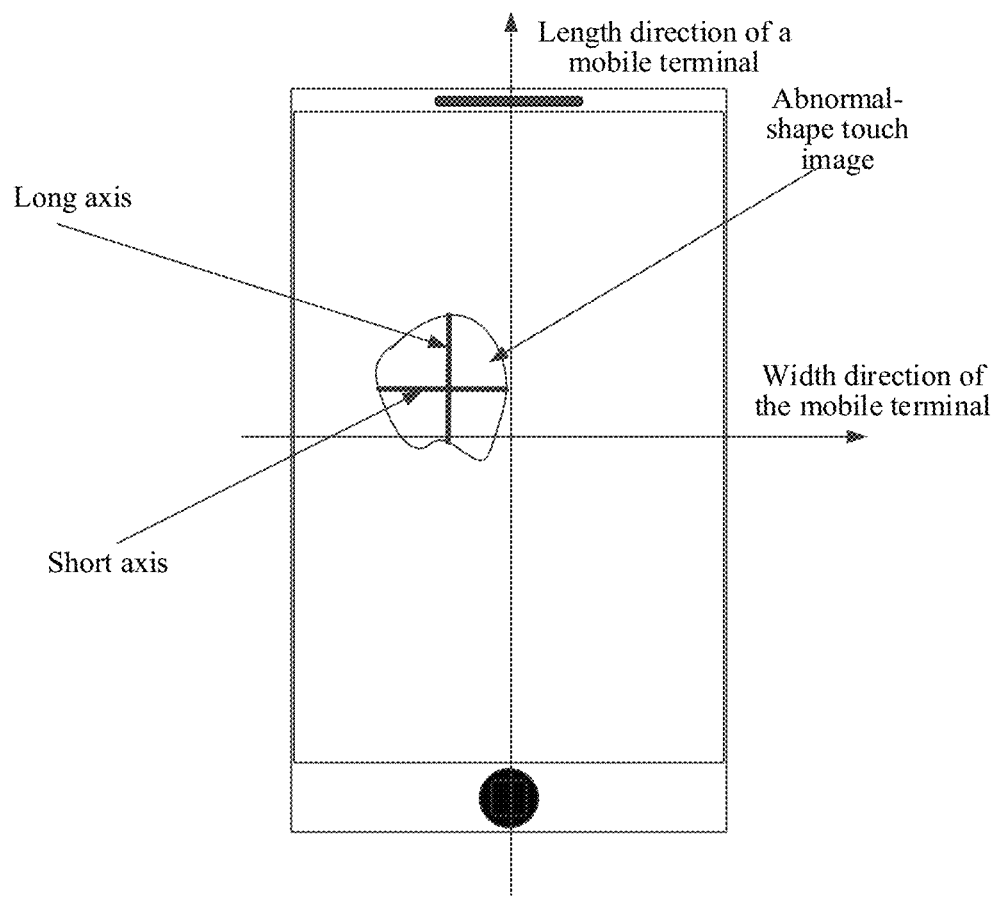
FIG. 2 is a schematic diagram of long and short axes of a capacitive image according to an embodiment of this application.

(2) An abnormal-shape touch image may be understood as a capacitive image that is different from a finger image and that is formed by an abnormal-shape accidental touch operation on the screen. The abnormal-shape touch image has a coverage area on the screen, and has a long axis and a short axis. The long axis may be understood as a central axis of the abnormal-shape touch image in a length direction of the terminal, and the short axis may be understood as a central axis of the abnormal-shape touch image in a width direction of the terminal. Refer to FIG. 2.

(3) An anti-accidental touch detection parameter may be understood as a parameter used to detect an accidental touch in an anti-accidental touch detection algorithm. For example, the parameter may include an abnormal-shape touch image attribute used to define an abnormal-shape touch image, and a quantity that is of frames for detecting an image and that is used to determine a detection time. The abnormal-shape touch image attribute includes but is not limited to at least one of a shape of the abnormal-shape touch image, an area of the abnormal-shape touch image, and long and short axis thresholds of the abnormal-shape touch image. The quantity of frames for detecting the image may be determined based on a frame reporting rate of the touch panel 1041 and a tolerance time of the user. For example, the quantity of frames for detecting the image may be a ratio of a frame reporting rate per second of the touch panel 1041 to the tolerance time of the user.

The following describes a specific implementation process of determining an accidental touch operation in the embodiments of this application.

Figure 3:
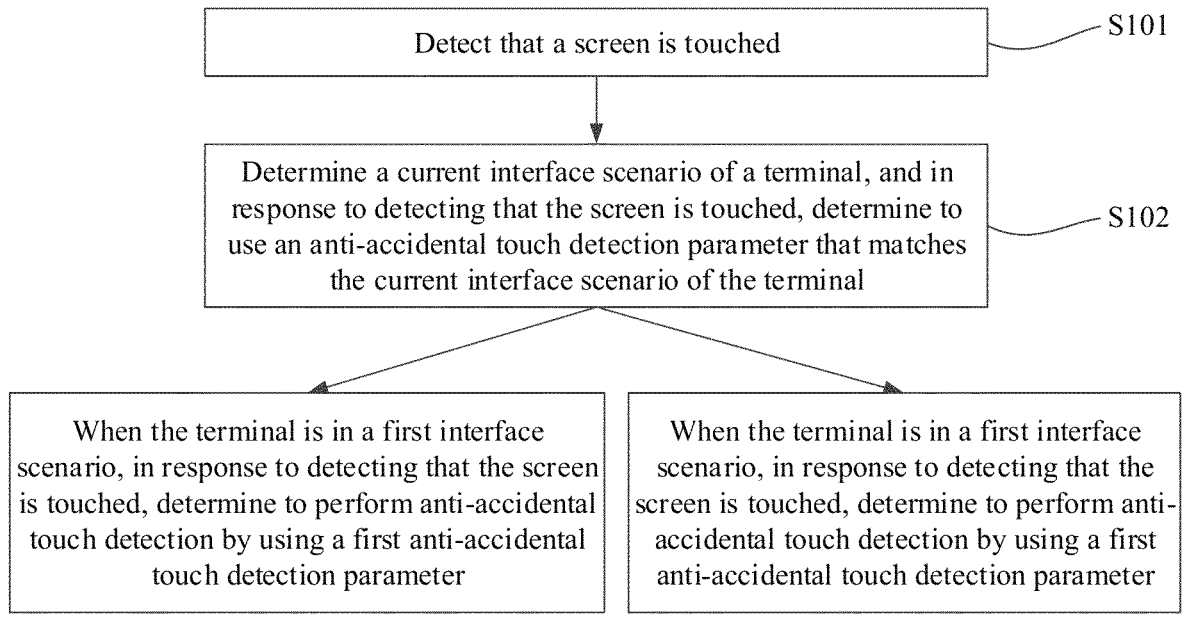
FIG. 3 is a flowchart of implementing an anti-accidental touch detection method according to an embodiment of this application.

FIG. 3 is a flowchart of an anti-accidental touch detection method according to an embodiment of this application. An execution body omitted in the method shown in FIG. 2 may be understood as the processor 101 of the terminal 100. Referring to FIG. 3, the method includes the following steps.

S101. Detect that a screen 103 is touched.

Specifically, that the screen 103 is touched may be understood as a touch operation that is performed by a user on or near a touch panel 1041 and that is obtained by a processor 101 from the touch panel 1041. The touch operation performed by the user on or near the touch panel 1041 may be a normal tapping operation performed by the user by using a finger or the like, or may be an accidental touch operation of non-finger tapping performed by a cheek, an ear, a thigh, and the like of the user.

S102. Determine a current interface scenario of the terminal, and in response to detecting that the screen is touched, determine to use an anti-accidental touch detection parameter that matches the current interface scenario of the terminal.

The current interface scenario of the terminal may be understood as an interface displayed on the screen 103 of the terminal 100 when the user performs an operation on or near the touch panel 1041. The interface displayed on the screen 103 of the terminal 100 may include but is not limited to a lock screen interface, a call interface, a password interface, and an input method interface.

In this embodiment of this application, the anti-accidental touch detection parameter includes at least one of an abnormal-shape touch image attribute and a quantity of frames for detecting an image. The abnormal-shape touch image attribute includes at least one of a shape of an abnormal-shape touch image, an area of the abnormal-shape touch image, and long and short axis thresholds of the abnormal-shape touch image. The quantity of frames for detecting the image is determined based on a frame reporting rate of a touchscreen of the terminal and a tolerance time of the user.

In this embodiment of this application, anti-accidental touch detection parameters corresponding to different interface scenarios may be preset, and the different interface scenarios are corresponding to different anti-accidental touch detection parameters, to determine an accidental touch operation by using different anti-accidental touch detection algorithms in different interface scenarios. To distinguish between the different interface scenarios in this embodiment of this application, an example in which different interface scenarios include a first interface scenario and a second interface scenario is used for description. To distinguish between the different anti-accidental touch detection parameters, an example in which an anti-accidental touch detection parameter corresponding to the first interface scenario is a first anti-accidental touch detection parameter and an anti-accidental touch detection parameter corresponding to the second interface scenario is a second anti-accidental touch detection parameter is used for description. Specifically, when the terminal is in the first interface scenario, in response to detecting that the screen is touched, the terminal determines to perform anti-accidental touch detection by using the first anti-accidental touch detection parameter. When the terminal is in the second interface scenario, in response to detecting that the screen is touched, the terminal determines to perform anti-accidental touch detection by using the second anti-accidental touch detection parameter. The first interface scenario may be the lock screen interface, the call interface, the password interface, or the input method interface. The second interface scenario may also be the lock screen interface, the call interface, the password interface, or the input method interface, but the first interface scenario is different from the second interface scenario. For example, the first interface scenario is the lock screen interface, and the second interface scenario may be the call interface. Other cases are similar, and are not listed one by one herein.

In this embodiment of this application, the first anti-accidental touch detection parameter used by the terminal to perform anti-accidental touch detection in the first interface scenario is different from the second anti-accidental touch detection parameter used by the terminal to perform anti-accidental touch detection in the second interface scenario, to perform anti-accidental touch detection automatically by using different anti-accidental touch detection parameters in different scenarios.

The following describes, with reference to actual application, the different anti-accidental touch detection parameters corresponding to the different interface scenarios in this embodiment of this application.

For example, when the interface scenario of the terminal 100 is the lock screen interface, to be specific, when the interface displayed on the screen 103 of the terminal 100 is the lock screen interface, an accidental touch may occur in a case in which the screen is on or is triggered by another application when the terminal is in a pocket. In this case, an abnormal-shape touch image in an anti-accidental touch detection parameter corresponding to the lock screen interface is generally a large-area capacitive shape. To be specific, a shape of the abnormal-shape touch image is a capacitive image shape, and an area of the abnormal-shape touch image is greater than a specified area. The user has a relatively low delay tolerance. Therefore, the quantity of frames for detecting the image may be set to single frame detection.

For another example, the interface scenario of the terminal 100 is the call interface, to be specific, when the interface displayed on the screen 103 of the terminal 100 is the call interface, an accidental touch may occur in a case in which a cheek and/or an ear is close to a touchscreen. In this case, a shape of an abnormal-shape touch image included in an anti-accidental touch detection parameter corresponding to the call interface may be a circle formed by touching the touchscreen by the cheek, or may be a long bar shape formed by touching the touchscreen by the ear. In this case, the long and short axis thresholds need to be lowered. For example, long and short axis thresholds of the abnormal-shape touch image may be set to be less than specified long and short axis thresholds. A requirement for a tolerance time of the user is not high, and therefore it may be set that the quantity of frames for detecting the image meets a predetermined range of a frame quantity. For example, when the tolerance time of the user is 1 ms to 5 ms and a frame reporting rate of the touch panel 1041 is 120 Hz, the quantity of frames for detecting the image may be about 3.

For still another example, when the interface scenario of the terminal 100 is the lock screen interface, to be specific, when the interface displayed on the screen 103 of the terminal 100 is a password interface, a scenario in which an accidental touch occurs is similar to that in the lock screen interface scenario. However, in this scenario, an operation that may be collected by the touch panel 1041 is a tapping operation, and no response is performed on a drag operation. In this scenario, the user has a relatively low delay tolerance and has a very high requirement for accuracy of detecting an accidental touch. In this case, a shape of an abnormal-shape touch image included in an anti-accidental touch detection parameter corresponding to the password interface is a capacitive image shape, an area of the abnormal-shape touch image is less than a specified area, and a quantity of frames for detecting image data is greater than a specified frame quantity. For example, the specified frame quantity may be 5.

In this embodiment of this application, to distinguish between specified areas in different scenarios, a specified area in the anti-accidental touch detection parameter corresponding to the lock screen interface may be referred to as a first specified area, and the specified area in the anti-accidental touch detection parameter corresponding to the password interface may be referred to as a second specified area.

For still another example, when the interface scenario of the terminal 100 is the input method interface, to be specific, when the interface displayed on the screen 103 of the terminal 100 is an input method interface, an accidental touch may occur mainly in a palm touch scenario. In this case, an area threshold of a capacitive image needs to be lowered to an order of magnitude of a finger. To be specific, an area threshold of an abnormal-shape touch image included in an anti-accidental touch detection parameter corresponding to the input method interface is less than an area of a finger image. Because a quick response needs to be made when the user performs tapping, a quantity of frames for detecting image data may be set to single frame detection.

It should be noted that an area of the capacitive image, an area of an abnormal-shape touch image, an area of a finger image, and the like in this embodiment of this application are areas of covering the touch panel by images formed by various touch points of the user on the touch panel 1041.

The interface displayed on the screen 103 of the terminal 100 may be a specific application (APP) predefined by a system, or may be a specific window (Activity) predefined by the system. Therefore, in this embodiment of this application, different anti-accidental touch detection parameters may be set for all application names and/or window names that can be displayed on the screen 103 of the terminal 100 and that are predefined by the system. In a possible example, detection configuration items corresponding to all the application names and/or window names that can be displayed on the screen 103 of the terminal 100 may be stored in the memory 102 in a form of a configuration table.

It may be understood that, the foregoing implementation process in which anti-accidental touch detection parameters corresponding to different interface scenarios are preset may be pre-defined by the system in a centralized manner, or may be defined by an application developer in an application and/or window developing process.

In this embodiment of this application, different anti-accidental touch detection parameters are set based on different interfaces displayed on the screen 103 of the terminal 100, so that an accidental touch operation can be determined by using different abnormal-shape anti-accidental touch detection algorithms in different interface scenarios, to implement a dynamic configuration of an anti-accidental touch detection parameter in the abnormal-shape anti-accidental touch detection algorithm. In addition, the anti-accidental touch detection parameters are configured based on different interface scenarios in this embodiment of this application. Therefore, different application requirements used by the user can be matched, to implement an application-level configuration of an abnormal-shape anti-accidental touch detection parameter.

In this embodiment of this application, after determining an interface scenario of a current touch operation, the processor 101 may determine an anti-accidental touch detection parameter that matches the interface scenario, and may further perform anti-accidental touch detection by using the matched anti-accidental touch detection parameter.

In this embodiment of this application, determining whether the current touch operation is an accidental touch operation based on the determined anti-accidental touch detection parameter may be implemented by using an existing method. For example, if an interface scenario of the current touch operation is the lock screen interface, the determined anti-accidental touch detection parameter is as follows: a shape of the abnormal-shape touch image is a capacitive image shape, the area threshold of the abnormal-shape touch image is greater than the first specified area, and the quantity of frames for detecting the image is single frame detection. During determining whether the current touch operation is an accidental touch operation, one-frame capacitive image data reported by the touch panel 1041 may be obtained. If it is determined, by using the capacitive image data, that a capacitive image area is greater than the specified area, it may be determined that the current touch operation is an accidental touch operation. If it is determined, by using the capacitive image data, that the capacitive image area is less than the specified area, it may be determined that the current touch operation is a non-accidental touch operation.

In a possible example, when the user performs an operation on the touch panel 1041 of the terminal 100, a normal touch operation may exist in an operation process, or an accidental touch may occur after the normal touch operation. In this case, touch feedback (non-accidental touch feedback) of a normal touch operation may be performed on a normal touch operation, and accidental touch operation feedback is performed on an accidental touch operation in this embodiment of this application. Specifically, if the processor 101 determines, based on the first N frames of images in the quantity of frames for detecting the image, that the current touch operation is a non-accidental touch operation, the processor 101 generates touch feedback, where N is a positive integer greater than or equal to 1. If the processor 101 determines, based on a frame of an image other than the first N frames in the quantity of frames for detecting the image, that the current touch operation is an accidental touch operation, the processor 101 recalls the generated touch feedback and performs accidental touch feedback. For example, when the user enters a password on the password input interface by tapping on a number by using a finger, the touch panel 1041 transmits capacitive image data to the processor 101 in a frame form after collecting a tapping operation of the user. The processor 101 obtains a first frame of capacitive image data. If a normal tapping operation is determined based on the first frame of capacitive image data, visual/sound feedback is generated through tapping. Upon subsequently obtaining the capacitive image data, if the processor 101 determines, based on a subsequently obtained capacitive image, that an accidental touch operation occurs, the processor 101 recalls visual feedback of the first frame, and an effect is that only a sound is fed back but there is no actual tapping response. It may be understood that, when an accidental touch occurs, the user generally does not look at the screen 103 of the terminal 100, and therefore generation of sound or visual feedback does not bother the user.

Figure 4:
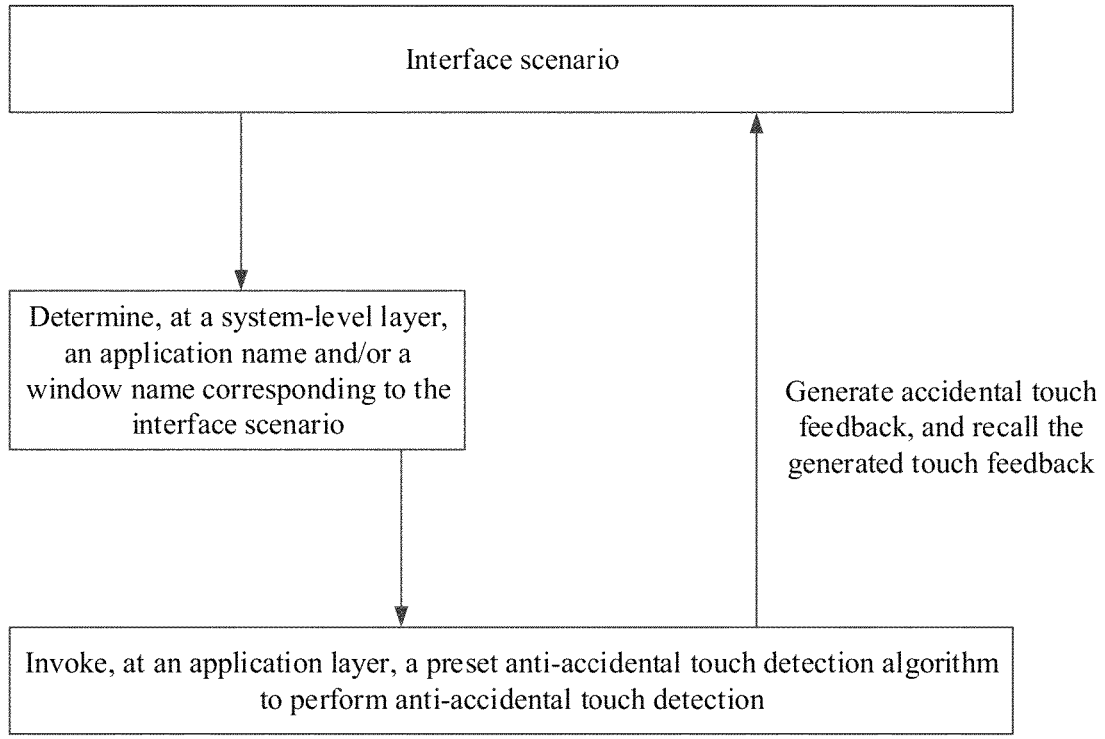
FIG. 4 is a schematic diagram of a process of detecting an accidental touch operation and a process of feeding back the accidental touch operation according to an embodiment of this application.

A process of detecting an accidental touch operation and a process of feeding back on an accidental touch operation in the foregoing embodiments of this application may be shown in FIG. 4. In FIG. 4, an application name and/or a window name corresponding to an interface scenario is determined at a system-level layer. Then, a preset anti-accidental touch detection algorithm is invoked at an application layer to determine whether an operation is an accidental touch operation, and anti-accidental touch detection is performed. When a normal non-accidental touch operation scenario is determined, normal touch feedback (non-accidental touch operation feedback) is performed. Once the accidental touch operation is determined, accidental touch feedback is generated, and generated touch feedback is recalled.

It may be understood that, to implement the foregoing functions, the terminal includes a corresponding hardware structure and/or software module for performing each of the functions. With reference to the units and algorithm steps described in the embodiments disclosed in this application, the embodiments of this application can be implemented in a form of hardware or hardware and computer software. Whether a function is performed by hardware or hardware driven by computer software depends on particular applications and design constraints of the technical solutions. A person skilled in the art may use different methods to implement the described functions for each particular application, but it should not be considered that the implementation falls beyond the scope of the technical solutions in the embodiments of this application.

In the embodiments of this application, function unit division may be performed on the terminal based on the foregoing method examples. For example, each function unit may be obtained through division based on a corresponding function, or two or more functions may be integrated into one processing unit. The integrated unit may be implemented in a form of hardware, or may be implemented in a form of a software functional unit. It should be noted that, in this embodiment of this application, unit division is an example, and is merely logical function division. In actual implementation, another division manner may be used.

Figure 5:
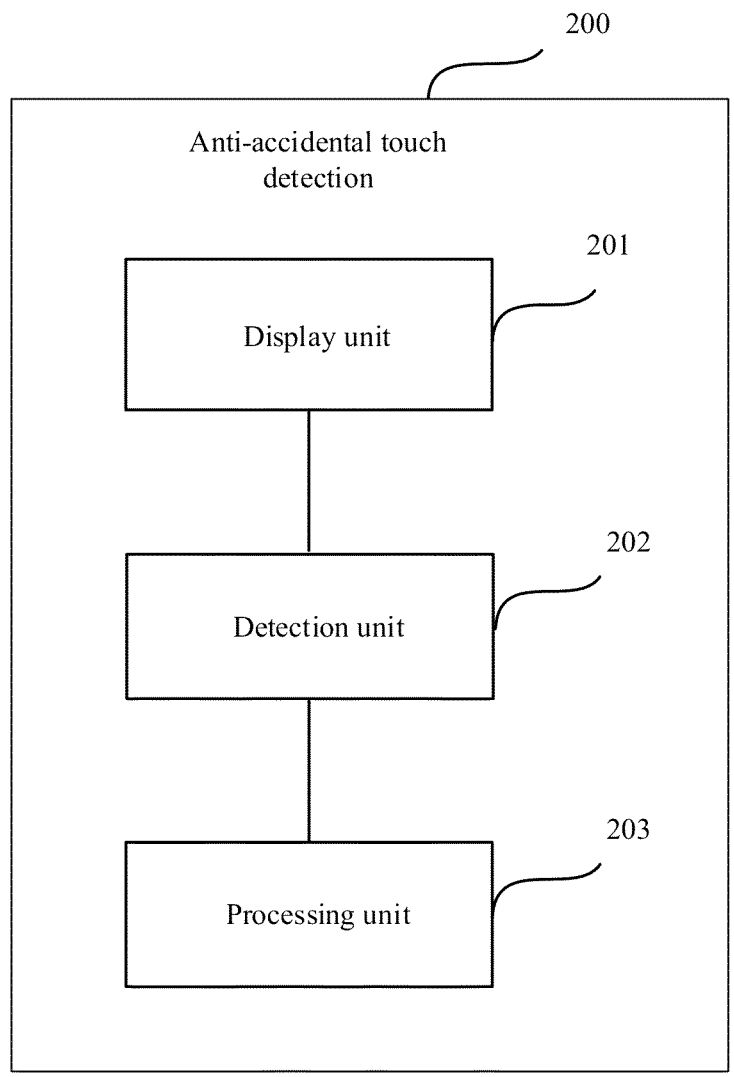
FIG. 5 is a schematic structural diagram of an anti-accidental touch detection apparatus according to an embodiment of this application.

When an integrated unit is used, FIG. 5 shows a schematic structural diagram of an anti-accidental touch detection apparatus according to an embodiment of this application. Referring to FIG. 5, an anti-accidental touch detection apparatus 200 is applied to a terminal, and the anti-accidental touch detection apparatus 200 includes a display unit 201, a detection unit 202, and a processing unit 203. The display unit 201 is configured to display an interface. The detection unit 202 is configured to detect a touch operation of a user. The processing unit 203 is configured to: when the interface displayed by the display unit 201 is a first interface scenario, in response to detecting by the detection unit 202 that a screen is touched, determine to perform anti-accidental touch detection by using a first anti-accidental touch detection parameter. When the interface displayed by the display unit 201 is a second interface scenario, in response to detecting by the detection unit 202 that a screen is touched, the display unit 201 determines to perform anti-accidental touch detection by using a second anti-accidental touch detection parameter.

The first interface scenario is different from the second interface scenario, and the first anti-accidental touch detection parameter is different from the second anti-accidental touch detection parameter. The first anti-accidental touch detection parameter and the second anti-accidental touch detection parameter each include at least one of an abnormal-shape touch image attribute and a quantity of frames for detecting an image. The abnormal-shape touch image attribute includes at least one of a shape of an abnormal-shape touch image, an area of the abnormal-shape touch image, and long and short axis thresholds of the abnormal-shape touch image. The quantity of frames for detecting the image is determined based on a frame reporting rate of the screen and a user tolerance time. For example, the quantity of frames for detecting the image may be a ratio of the frame reporting rate of the screen to the user tolerance time.

In a possible implementation, the processing unit 203 may preset anti-accidental touch detection parameters corresponding to different interface scenarios. For example, an anti-accidental touch detection parameter corresponding to a call interface includes: a shape of the abnormal-shape touch image is a circle or a long bar shape, long and short axis thresholds of the abnormal-shape touch image are less than specified long and short axis thresholds, and the quantity of frames for detecting the image meets a predetermined range of a frame quantity.

For another example, an anti-accidental touch detection parameter corresponding to a password interface includes: a shape of the abnormal-shape touch image is a capacitive image shape, an area of the abnormal-shape touch image is less than a second specified area, and a quantity of frames for detecting an image is greater than a specified frame quantity.

For still another example, an anti-accidental touch detection parameter corresponding to an input method interface includes: an area of the abnormal-shape touch image is less than an area of a finger image, and a quantity of frames for detecting the image is single frame detection.

In another possible implementation, the processing unit 203 is further configured to: after performing anti-accidental touch detection, generate touch feedback if the processing unit 203 determines, based on first N frames of images in the quantity of frames for detecting the image, that a non-accidental touch operation is detected, where N is a positive integer greater than or equal to 1; and recall generated touch feedback and perform accidental touch feedback if the processing unit 203 determines, based on a frame of image other than the first N frames of images in the quantity of frames for detecting the image, that an accidental operation is detected.

It should be noted that the anti-accidental touch detection apparatus 200 provided in this embodiment of this application has all functions for implementing the anti-accidental touch detection method processes in the foregoing method embodiments. For a specific implementation process of the anti-accidental touch detection apparatus 200, refer to related descriptions in the foregoing embodiments and the accompanying drawings. Details are not described herein.

When a form of hardware is used, the display unit may be a screen, the detection unit may be an input/output device, and the processing unit may be a processor. The input/output device may be a touchscreen, a physical button, various sensors such as a pressure sensor, a touch sensor, a range sensor, an infrared sensor, and a light sensor, a sound capture apparatus, or an image capture apparatus such as a microphone or a camera. The user may operate the apparatus by using the detection unit, to control the apparatus to execute a user command and run a specific function. If the display unit is a screen, the detection unit is an input/output device, and the processing unit is a processor, the anti-accidental touch detection apparatus may be the terminal shown in FIG. 1. The terminal includes a processor, a memory, a screen, and an input/output device. The screen, the input/output device, and the memory are all connected to the processor by using a bus, and the screen is configured to display an interface. The input/output device is configured to detect a touch operation of a user. The memory is configured to store program code to be executed by the processor. The processor is configured to: invoke the program code stored in the memory, and when the terminal is in the first interface scenario, in response to detecting by the input/output device that the screen is touched, determine to perform anti-accidental touch detection by using a first anti-accidental touch detection parameter in the foregoing embodiments. When the terminal is in the second interface scenario, in response to detecting by the input/output device that the screen is touched, the processor determines to perform an anti-accidental touch detection process by using a second anti-accidental touch detection parameter.

For a process of performing anti-accidental touch detection by the terminal, refer to an implementation process of anti-accidental touch detection described in the foregoing embodiment. Details are not described herein again.

According to the anti-accidental touch detection method and apparatus, and the terminal provided in the embodiments of this application, the anti-accidental touch detection is performed by using different abnormal-shape anti-accidental touch detection algorithms in different interface scenarios, so that different application requirements used by the user can be matched, to implement an application-level configuration of an abnormal-shape anti-accidental touch detection parameter.

An embodiment of this application further provides a computer-readable storage medium, and the computer-readable storage medium stores an instruction. When the instruction is run on a computer, the computer is enabled to perform the anti-accidental touch detection method in the foregoing embodiment.

An embodiment of this application further provides a computer program product including an instruction. When the computer program product including the instruction is run on a computer, the computer is enabled to perform the anti-accidental touch detection method in the foregoing embodiment.

A person skilled in the art should understand that the embodiments of this application may be provided as a method, a system, or a computer program product. Therefore, the embodiments of this application may use a form of hardware only embodiments, software only embodiments, or embodiments with a combination of software and hardware. Moreover, the embodiments of this application may use a form of a computer program product that is implemented on one or more computer-usable storage media (including but not limited to a disk memory, a CD-ROM, an optical memory, and the like) that include computer-usable program code.

The embodiments of this application are described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device to generate computer-implemented processing. Therefore, the instructions executed on the computer or the another programmable device provide steps for implementing a specific function in one or more processes in the flowcharts and/or in one or more blocks in the block diagrams.

What is claimed is:

1. An anti-accidental touch detection method, applied to a terminal, wherein the method comprises:
   in response to detecting a touching on a screen of the terminal, determining, from a plurality of preset interface scenarios, an interface scenario that the terminal is in;
   identifying, from a plurality of different anti-accidental touch detection parameters, an anti-accidental touch detection parameter that corresponds to the determined interface scenario, wherein each of the plurality of different anti-accidental touch detection parameters is preset for one of the plurality of preset interface scenarios, and comprises at least one of an attribute of an image of the touching and a quantity of frames for detecting the image; and
   performing an anti-accidental touch detection operation using the identified anti-accidental touch detection parameter that matches the identified interface scenario to determine whether the touching is accidental.

2. The method according to claim 1, wherein the attribute of the image of the touching comprises at least one of a shape of the image, an area of the image, and long and short axis thresholds of the image.

3. The method according to claim 1, wherein the quantity of frames for detecting the image is determined based on a frame reporting rate of the screen and a tolerance time of a user.

4. The method according to claim 1, wherein the determined interface scenario is a lock screen interface, and the anti-accidental touch detection parameter corresponding to the lock screen interface comprises: a shape of the image is a capacitive image shape, an area of the image is greater than a first specified area, and the quantity of frames for detecting the image is single frame detection.

5. The method according to claim 1, wherein the determined interface scenario is a call interface, and the anti-accidental touch detection parameter corresponding to the call interface comprises: a shape of the image is a circle or a long bar shape, long and short axis thresholds of the image are less than specified long and short axis thresholds, and the quantity of frames for detecting the image meets a predetermined range of a frame quantity.

6. The method according to claim 1, wherein the determined interface scenario is a password interface, and the anti-accidental touch detection parameter corresponding to the password interface comprises: a shape of the image is a capacitive image shape, an area of the image is less than a second specified area, and the quantity of frames for detecting the image is greater than a specified frame quantity.

7. The method according to claim 1, wherein the determined interface scenario is an input method interface, and the anti-accidental touch detection parameter corresponding to the input method interface comprises: an area of the image is less than an area of a finger image, and the quantity of frames for detecting the image is single frame detection.

8. The method according to claim 1, wherein after the terminal performs the anti-accidental touch detection, the method further comprises:
   generating touch feedback when the terminal determines, based on first N frames of images in the quantity of frames for detecting the image, that the touching is not accidental wherein N is a positive integer greater than or equal to 1; and
   recalling generated touch feedback and performing accidental touch feedback when the terminal determines, based on a frame of image other than the first N frames of images in the quantity of frames for detecting the image, that the touch operation is accidental.

9. An electronic terminal, comprising one or more processors, one or more memories, a display, and an input/output device, wherein
   the display, the input/output device, and the one or more memories are all connected to the processor by using a bus;
   the display is configured to display an interface;
   the input/output device is configured to detect a touching of a user;
   the one or more memories are configured to store program code to be executed by the processor; and
   the one or more processors are configured to invoke the program code stored in the memory to perform the following operations:

in response to detecting by the input/output device a touching on a screen of the input/output device, determining, from a plurality of preset interface scenarios, an interface scenario that the terminal is in;

identifying, from a plurality of different anti-accidental touch detection parameters, an anti-accidental touch detection parameter that corresponds to the determined interface scenario, wherein each of the plurality of different anti-accidental touch detection parameters is preset for one of the plurality of preset interface scenarios, and comprises at least one of an attribute of an image of the touching and a quantity of frames for detecting the image; and performing an anti-accidental touch detection operation using the identified anti-accidental touch detection parameter that matches the identified interface scenario to determine whether the touching is accidental.

10. The terminal according to claim 9, wherein the attribute comprises at least one of a shape of the image, an area of the image, and long and short axis thresholds of the image.

11. The terminal according to claim 9, wherein the quantity of frames for detecting the image is determined based on a frame reporting rate of the screen and a tolerance time of the user.

12. The terminal according to claim 9, wherein the determined interface scenario is a lock screen interface, and the anti-accidental touch detection parameter corresponding to the lock screen interface comprises: a shape of the image is a capacitive image shape, an area of the image is greater than a first specified area, and the quantity of frames for detecting the image is single frame detection.

13. The terminal according to claim 9, wherein the determined interface scenario is a call interface, and the anti-accidental touch detection parameter corresponding to the call interface comprises: a shape of the image is a circle or a long bar shape, long and short axis thresholds of the image are less than specified long and short axis thresholds, and the quantity of frames for detecting the image meets a predetermined range of a frame quantity.

14. The terminal according to claim 9, wherein the determined interface scenario is a password interface, and the anti-accidental touch detection parameter corresponding to the password interface comprises: a shape of the image is a capacitive image shape, an area of the image is less than a second specified area, and the quantity of frames for detecting the image is greater than a specified frame quantity.

15. The terminal according to claim 9, wherein the determined interface scenario is an input method interface, and the anti-accidental touch detection parameter corresponding to the input method interface comprises: an area of the image is less than an area of a finger image, and the quantity of frames for detecting the image is single frame detection.

16. The terminal according to claim 9, wherein the one or more processors are further configured to:

after performing anti-accidental touch detection, generate touch feedback when the one or more processors determine, based on first N frames of images in the quantity of frames for detecting the image, that the touching is non-accidental, wherein N is a positive integer greater than or equal to 1; and recall generated touch feedback and perform accidental touch feedback when the one or more processors determine, based on a frame of image other than the first N frames of images in the quantity of frames for detecting the image, that the touching is accidental.

17. A non-transitory computer-readable storage medium, wherein the computer-readable storage medium stores an instruction, and when the instruction is run on a computer, the computer is enabled to perform the method according to claim 1.

* * * * *